United States Patent [19]

Cone

[11] Patent Number: 4,606,550
[45] Date of Patent: Aug. 19, 1986

[54] COLLAPSIBLE STROLLER

[75] Inventor: Richard E. Cone, Dayton, Ohio

[73] Assignee: Spalding & Evenflo Companies, Inc., Tampa, Fla.

[21] Appl. No.: 549,223

[22] Filed: Nov. 7, 1983

Related U.S. Application Data

[63] Continuation of Ser. No. 306,633, Sep. 28, 1981, abandoned.

[51] Int. Cl.[4] ............................................. B62B 11/00
[52] U.S. Cl. .................................... 280/642; 280/650
[58] Field of Search ............... 280/641, 642, 644, 647, 280/650

[56] References Cited

U.S. PATENT DOCUMENTS

| | | | |
|---|---|---|---|
| 3,556,546 | 1/1971 | Garner | 280/644 |
| 3,561,787 | 2/1971 | Toda et al. | 280/642 |
| 3,799,567 | 3/1974 | Toda | 280/644 |
| 4,191,397 | 3/1980 | Kassai | 280/647 |
| 4,317,581 | 3/1982 | Kassai | 280/644 |
| 4,378,946 | 4/1983 | Voytko et al. | 280/642 |

Primary Examiner—John J. Love
Assistant Examiner—Michael Mar
Attorney, Agent, or Firm—Donald R. Bahr; John E. Benoit

[57] ABSTRACT

A collapsible stroller wherein the seat support frame, front frame, rear frame and handle are pivotally mounted together. A releasable locking device is provided for interconnecting all of the frame parts. A release bar is located near the bight of the handle for a one-handed release operation of the locking means. When folded, the release bar cooperates with the bight of the lower front frame through an aperture in a foot rest so as to form a composite carrying means whereby the folded stroller may be carried. The subject stroller further incorporates a two-piece rigid baby support assembly.

6 Claims, 17 Drawing Figures

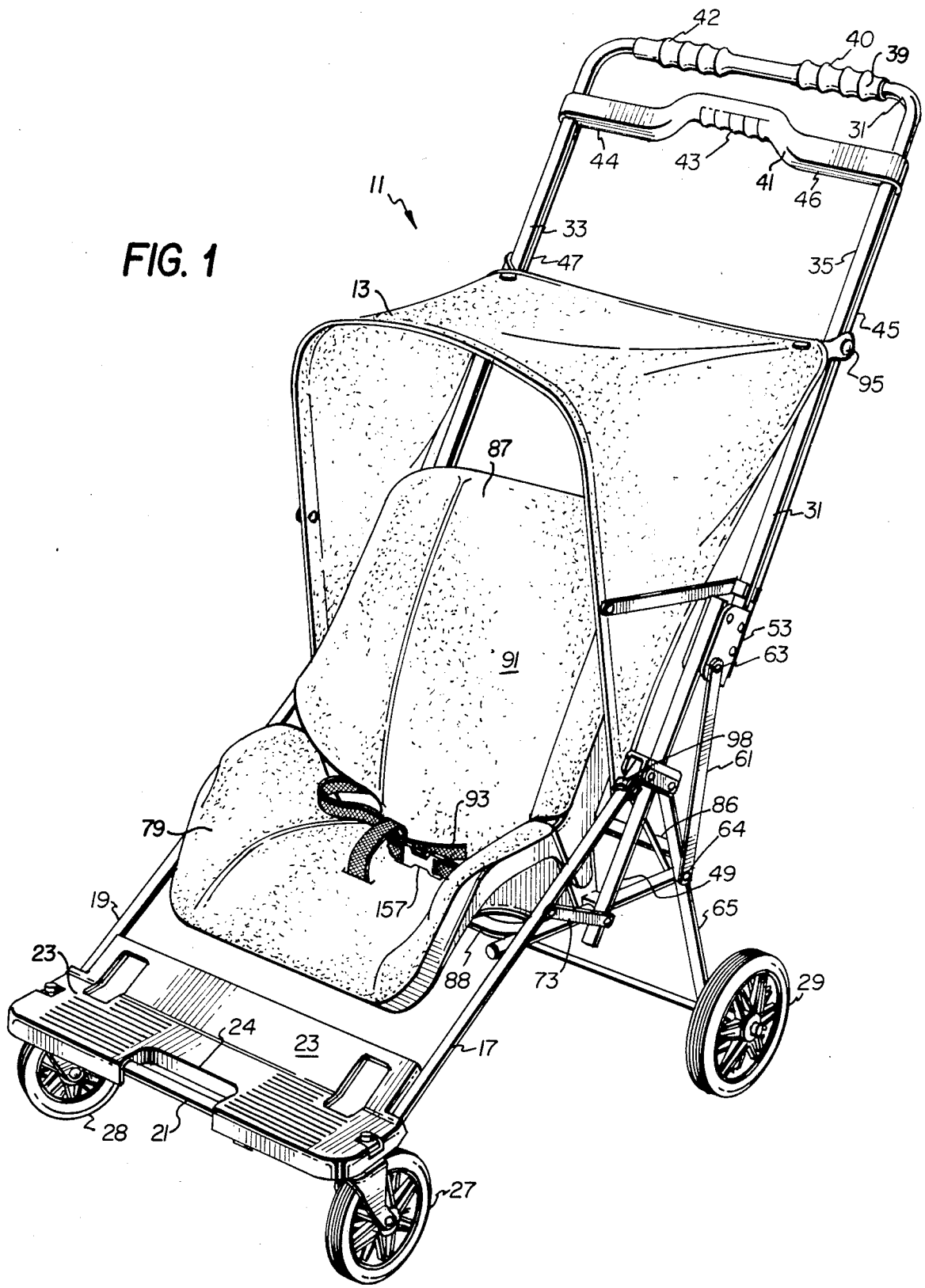

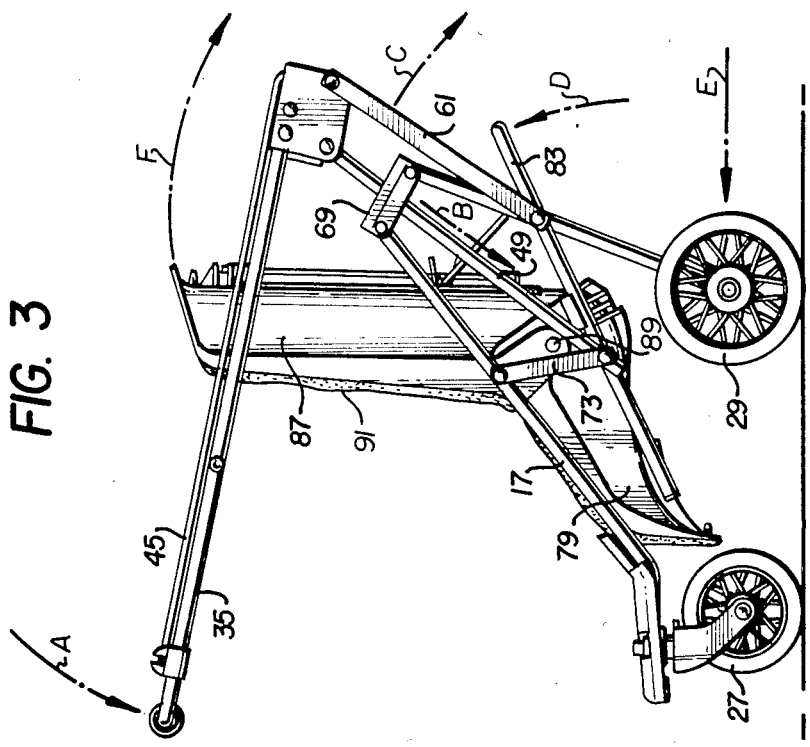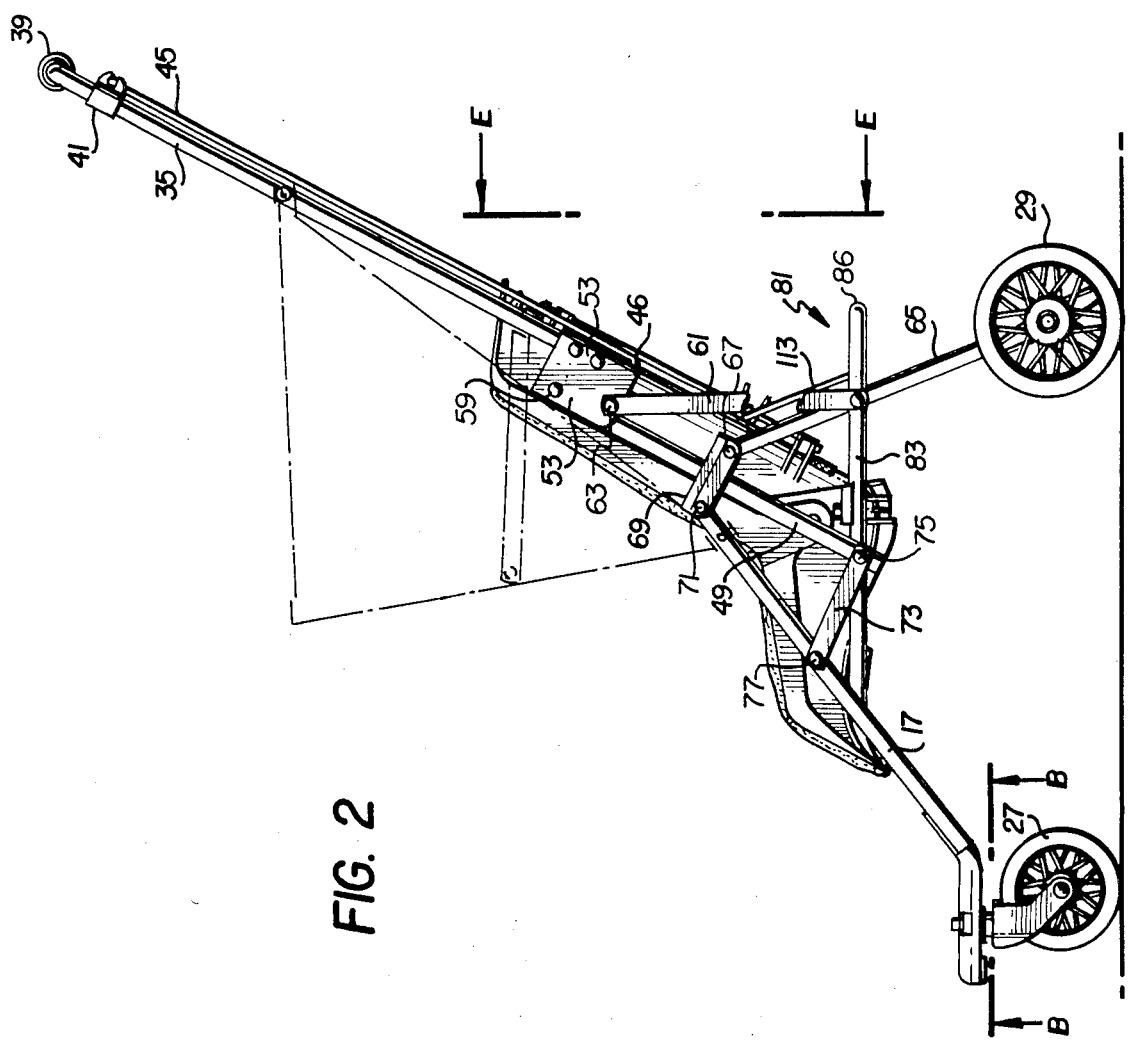

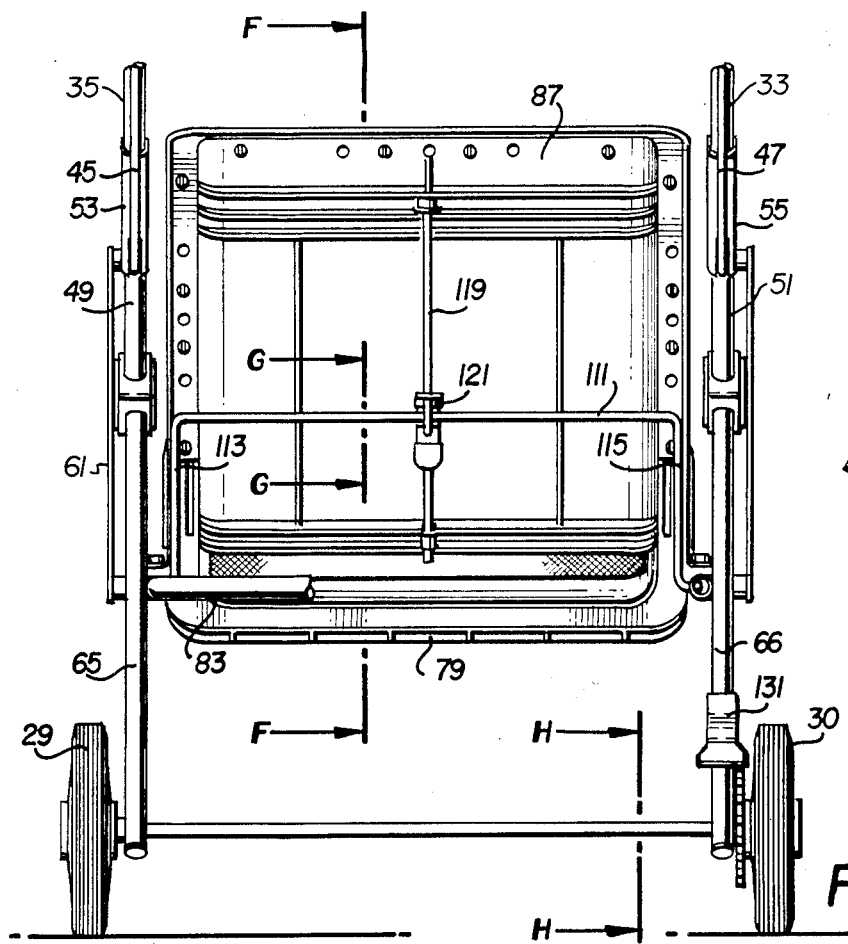
FIG. 9
FIG. 11
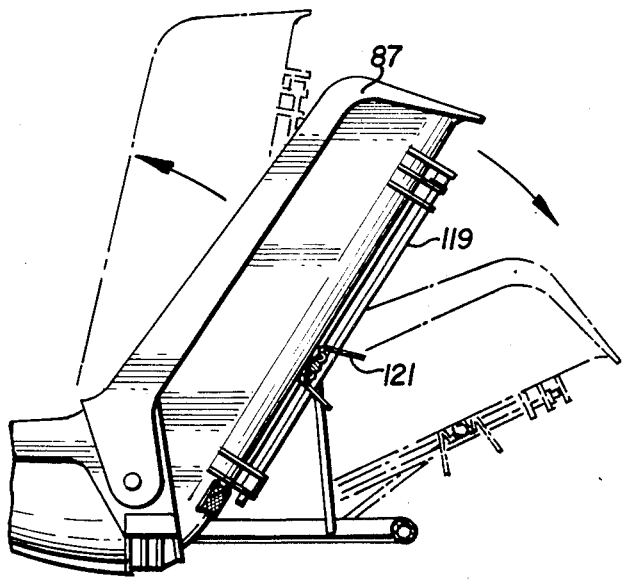
FIG. 10
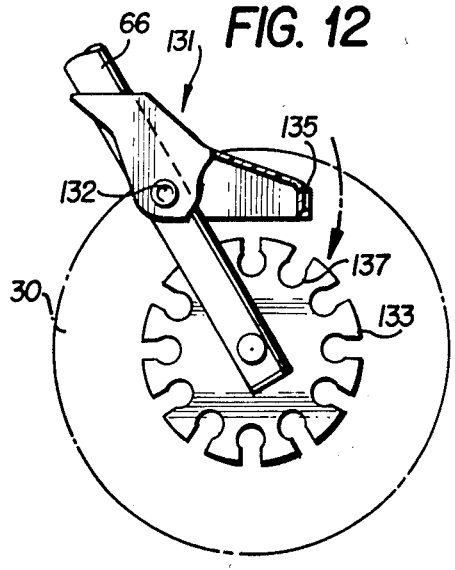
FIG. 12

COLLAPSIBLE STROLLER

This application is a continuation of application Ser. No. 306,633, filed Sept. 28, 1981, now abandoned.

This invention relates generally to baby strollers and more specifically to collapsible strollers and, particularly, to improvements in the collapsing and locking mechanism which permits easy operation and compact storage of the stroller. The stroller of the invention further incorporates a two-piece rigid baby support assembly. When collapsed, the stroller components are positioned in such a manner that a carrying means is formed whereby the stroller may be transported.

BACKGROUND OF THE INVENTION

Baby strollers have been in use for a long period of time. Due to the greater mobility of people which occurred during the past years, baby strollers have been manufactured that lock in an erect position and are somewhat collapsible so as to be able to transport them in automobiles and conveniently store them in homes.

One of the problems with the strollers in use today is that the operation requires some rather complex control movements and almost always requires that the user have both hands available for either erecting or collapsing the stroller. Obviously, this is a serious disadvantage when one is carrying a child in one arm and is attempting to operate the mechanism of the stroller with the other hand.

A further disadvantage in presently known strollers is that, even though they are collapsible, they are still quite bulky and take up considerable room when in the collapsed position. This not only makes them inconvenient to carry in automobiles and the like, but necessarily requires considerable storage room even in the home.

Accordingly, it is an object of the present invention to provide a collapsible stroller which may be moved from its upright locked and working position to its collapsed position with the use of a single hand for operating the mechanism.

A further object of the invention is to provide a collapsible baby stroller wherein, when it is in its collapsed folded position, it takes up a minimal amount of space and is easily transported and is easily stored.

SUMMARY OF THE INVENTION

The present invention provides a collapsible stroller comprising a seat support frame, a seat and back mounted thereon, a front frame carrying the two forward wheels, a rear frame carrying the two rear wheels and a U-shaped handle extending upwardly from the front and the rear frames. Means are provided for pivotally interconnecting the seat support frame, front frame, rear frame and the ends of the U-shaped handle so that they may be moved relative to each other from an upright operable position to a substantially flat position. Releasable locking means are provided for interconnecting the seat support frame, front frame, rear frame and handle for releasably locking said frames in an upright position. A release bar is slidably mounted on the legs of the U-shaped handle adjacent the bight of the handle and a release rod is secured between the release bar and the releasable locking means whereby movement of said release bar towards the bight of the handle releases the locking means and allows the stroller to be folded into a collapsed position. When folded, the bight of the handle cooperates with the bight of the lower front frame through an aperture in a foot rest so as to form a composite carrying means whereby the folded stroller may be carried. As the folding operation is completed, the composite carrying means is adjacent the hand of the user and the stroller may be immediately raised to a carrying position. When the stroller is raised to an upright operative position, the locking means snaps back into place.

BRIEF DESCRIPTION OF THE DRAWINGS

FIG. 1 is a perspective view of the stroller in its upright operative position with the canopy attached;

FIG. 2 is a side elevational view of the stroller of FIG. 1 with the canopy removed;

FIG. 3 is a side elevational view of the stroller of FIG. 1 in a partially collapsed position;

FIG. 9 is a partial rear view of the stroller of FIG. 1;

FIG. 10 is a partial sectional view as taken along the lines F—F of FIG. 9;

FIG. 11 is a partial sectional view taken along the lines G—G of FIG. 9;

FIG. 12 is a partial sectional view taken along the lines H—H of FIG. 9;

DESCRIPTION OF THE PREFERRED EMBODIMENT OF THE INVENTION

Figure 4:
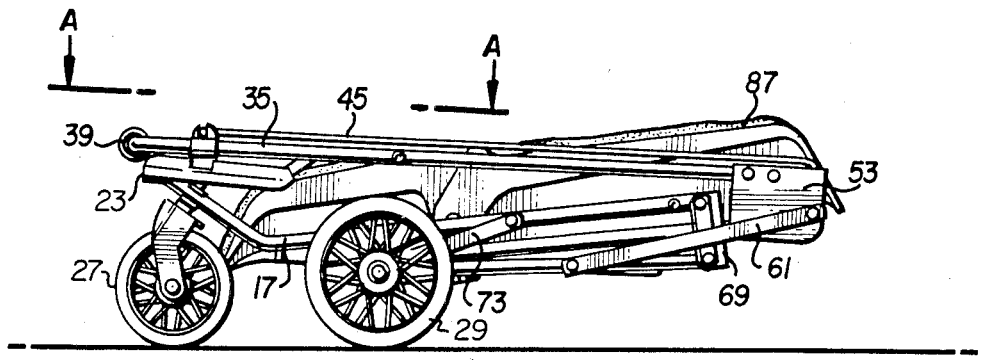
FIG. 4 is a side elevational view of the stroller of FIG. 1 in its collapsed position.

Turning now more specifically to the drawings, there is shown in FIG. 1 a perspective view of the stroller 11 including removable canopy 13. The frame of the stroller is comprised of the various parts which will be described below. It is to be understood that each side of the stroller is substantially identical in that it is a mirror image as far as the frame is concerned. Accordingly, the following description will generally relate to the operation and structure of a single side of the stroller.

Lower U-shaped section 15 comprises legs 17 and 19 interconnected by bight 21. In order to accommodate foot rest 23 and wheels front 27 and 28, the bight section of the U-shaped section 15 assumes an angle so as to provide support for a generally horizontal foot rest with respect to the ground. Rear wheels 29 and 30 are interconnected by axle 28.

The handle structure comprises a U-shaped tube 31 having legs 33 and 35 with a bight 37. A grip 39 is molded about bight section 37 for the general purpose of providing a more stable gripping surface. A release bar 41 is slidably mounted between legs 33 and 35 adjacent bight 37 for reasons which will become evident. Release bar 41 is configured so as to provide grip 43 which allows for the one single handed operation which is to be described below. Release rods 45 and 47 extend from release bar 41 downwardly and terminate at their lower ends in a finger 46 as can be more clearly seen in FIG. 13.

Figure 5:
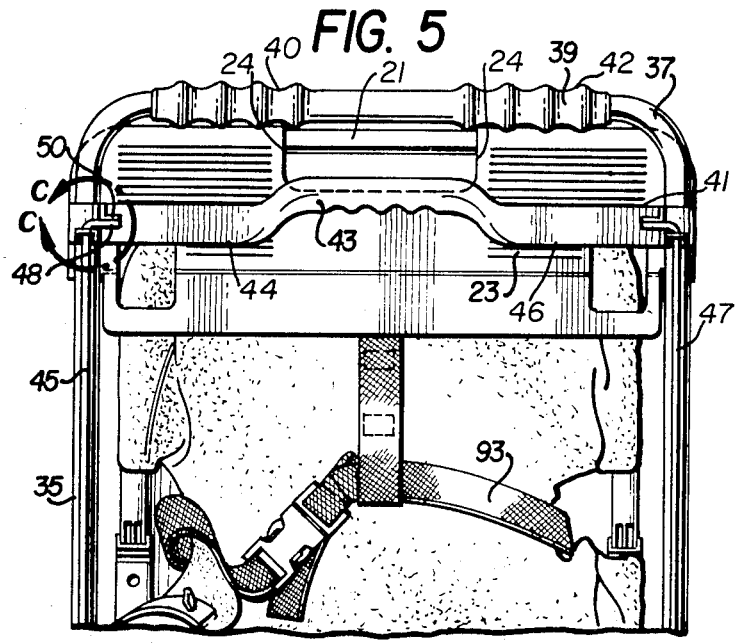
FIG. 5 is a partial plan view taken as indicated along the lines A—A of FIG. 4.

As can be seen from FIGS. 1 and 5, grip 43 of release bar 41 is positioned substantially adjacent to bight 37. Grip 43 is positioned in relation to bight 37 so that the fingers of the user can grasp bight 37 and draw release bar 31 towards handle 39 so as to unlock the locking mechanism. Grip section 43 of grip 41 is offset toward the bight of the handle from sections 44 and 46. This provides a reduced separation between bight 37 and grip 41 while permitting the release bar to freely slide along legs 33 and 35 without being restricted by the arcuate corners at either end of bight 37. When the stroller is collapsed, bight 37 is positioned adjacent to bight 21. Bight 37 may include handle 39. When the fingers of a human hand are placed through aperture 24, the hand grasps both bight 21 and bight 37 in such a manner as to secure the component parts of the folded stroller. Accordingly, when grasped by the human hand, bight 37 is secured in relation to bight 21 and, therefore, the stroller of this invention can be immediately raised and carried without the possibility of the stroller opening.

Release bar 41 is positioned on U-shaped tube 31 in such a manner that bight 37 does not significantly block aperture 24 when the stroller is folded as is shown in FIGS. 4 and 5.

Figure 13:
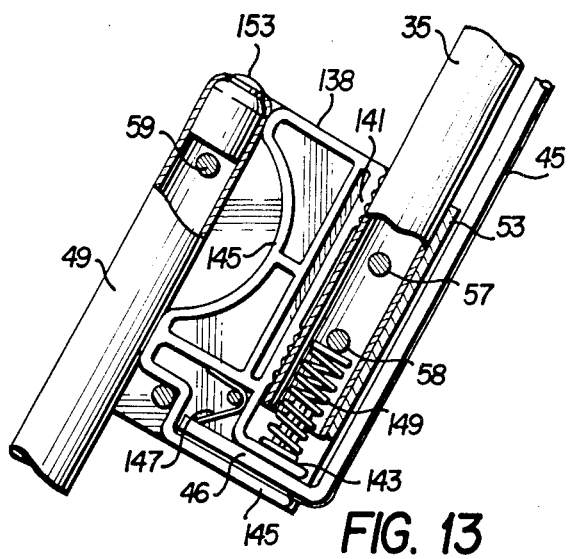
FIG. 13 is a partial sectional view of the locking mechanism used with the stroller of FIG. 1 as shown in its upright position.

Referring to FIGS. 2, 9 and 13 connecting rods 49 and 51 are pivotally secured to metal brackets 53 and 55 by means such as rivets 59. Metal brackets 53 and 55 are secured to the legs 33 and 35 of the handle by means such as rivets 57 and 58. Metal bracket 53 also contains the release locking mechanism as used with the stroller which is actuated for release purposes by the finger 46. This operation will be discussed in more detail relative to FIGS. 13 through 15.

As is shown in FIGS. 2 and 3 hinge 61 is pivotally connected between metal bracket 53 and rear leg member 65 by means of such as rivets 63 and 64. As previously mentioned, the same structure as discussed herein exists on the opposite side of the stroller.

Hollow rigid block 69 slidably passes along connecting rod 49. Leg 17 and rear leg 65 are pivotally connected to hollow block 69 by means such as rivets 67 and 71. Hinge 73 extends between connecting bar 49 and leg 17 and is pivotally connected thereto by means such as rivets 75 and 77.

A molded seat 79 is secured to seat support frame 83 which, in the present illustration, assumes a rectangular shape having horizontal bars 83 and 85 and cross bars 86 and 88. The structure shown uses a U-shaped member which is secured to cross bar 86 at the front end thereof. A molded back 87 is pivotally connected to molded seat 79 by means such as rivet 89. It is the normal practice to secure a quilted pad 91 or the like to the seat and back structure so as to provide comfort for the occupant. There is also provided a safety harness 93 including the usual crotch member and a latching mechanism 157. Canopy 13 is removably attached to the frame member by means such as snap 95 and flexible clamps 98 and 99 not shown. This allows for the use of the stroller either with or without the canopy.

Turning now to FIGS. 2 and 3, there is presented therein side elevational views illustrating the release and partial collapse of the stroller of FIG. 1. The stroller as shown in FIG. 2 is in its upright locked, and operable position with the elements indicated as discussed hereinabove relative to FIG. 1. When the bar grip 43 is grasped by the fingers of one hand with the palm of the hand resting on handle 39 and the thumb under the handle, squeezing of the hand will result in movement of the release bar 41 in a direction towards bight 37 of the U-shaped member 31. This, in turn, carries rods 45 and 47 in the upward direction and releases the locking mechanism as will be described in detail as the description proceeds. When the locking mechanism is released, the U-shaped bar handle is pushed in the direction as shown by the arrow A of FIG. 3. This causes connecting rod 49 to slide through hollow block 69 in a direction as shown by the arrow B in FIG. 3. This movement, because of the pivoted structure, causes rotation of hinges 61 and 73 to move in the direction also indicated by the arrow C. During this movement, seat support frame 83 moves in the direction indicated by the arrow D relating thereto. At the same time, the collapsing motion causes wheel 29 to move towards wheel 27 also as indicated by the arrow E. Prior to the collapsing procedure, seat back 87 may be moved in the direction of arrow F by releasing spring clamp 121 as discussed relative to FIGS. 9, 10 and 11.

FIG. 4 illustrates the stroller in a totally collapsed position which, as can be seen, is an extremely compact and flat structure and, therefore, easily carried about by means of bight 21 and 37 (FIG. 1).

Figure 6:
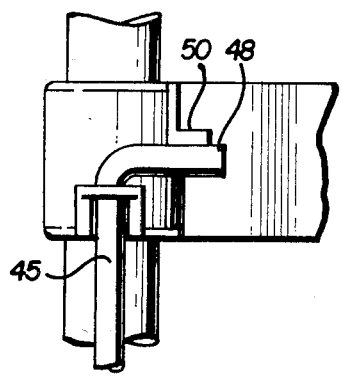
FIG. 6 is an exploded view of the area indicated at C—C of FIG. 5.

FIG. 5 is a partial top view of the collapsed stroller as indicated by lines A—A of FIG. 4. As can be seen, in FIGS. 5 and 6, release rod 45 has an upper finger 48 which extends below flange 50 after the rod 45 has passed through a section of release bar 41. Release bar 41 may normally be molded in a single piece and slipped over U-shaped member 31 prior to assembly of the stroller in circle C—C of FIG. 5. FIG. 6 is an exploded view of the finger 48 and retaining flange 50.

Figure 7:
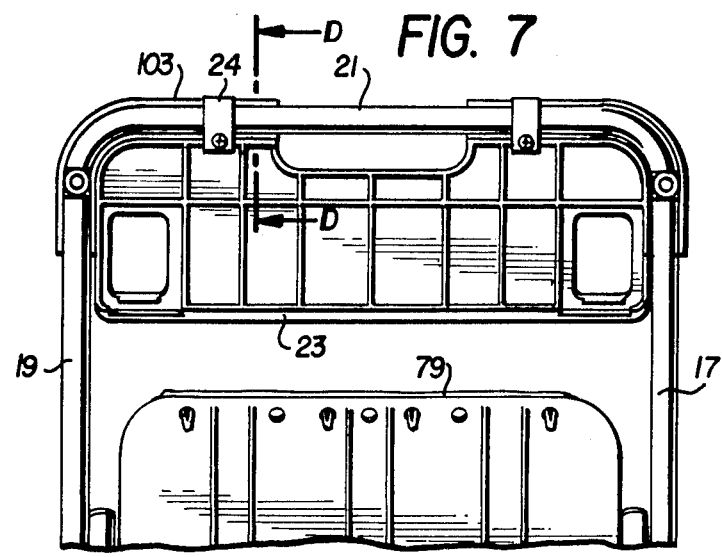
FIG. 7 is a partial bottom view as taken along the lines B—B of FIG. 2.

FIG. 7 is a partial bottom view as taken along the lines B—B of FIG. 2. As can be seen, foot rest 23 is secured to bight 21 by means such as integral straps 24. It should be noted that, in this view, the wheels have been removed for purposes of clarity.

Figure 8:
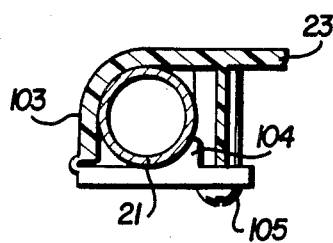
FIG. 8 is a partial sectional view taken along the lines D—D of FIG. 7.

FIG. 8 is an exploded view taken along the lines D—D of FIG. 7 showing the curved edge 103 of foot rest 23 and flange 104 which retains the foot rest in place. The structure may be secured together by means such as screw 105.

FIG. 9 is a rear view of the stroller of FIG. 1 with the handle section being only partially shown. The molded back 87, as previously indicated, is pivotally mounted to molded seat 79 so that it may be adjusted in accordance with the position desired. An infinite number of positions are provided by the particular mechanism shown herein. Referring to FIGS. 9 and 11, it can be seen that rod 111 extends horizontally across the back and terminates in legs 113 and 115 which extend into seat frame 83 and are rotatable therein. Rod 111 extends through spring clamp 121 which, through binding friction action, maintains the seat in position until the arms 123 and 125 are squeezed together so as to release the frictional hold. Accordingly, the seat is adjusted to the position desired and the arms 123 and 125 are released so as to again provide the frictional lock.

FIG. 10 illustrates the seat back in various positions by dotted lines. It should be noted that, under normal circumstances, the seat back will be lowered to the bottom position shown in FIG. 10 before the stroller is collapsed. Although this is not necessary, it does provide for a more compact package when the stroller is collapsed.

As is well known, all strollers are required to have some type of braking mechanism. FIG. 12 is a partial sectional view taken along the lines H—H of FIG. 9. As indicated therein, a brake set and release 131 is pivoted to one of the rear legs 66 by means of such as rivet 132. A toothed wheel 133 is secured to wheel 30 whereby rotation of brake set and release 131 in the direction shown by the arrow causes lip 135 to enter opening 137 between the teeth of toothed wheel 133, thereby preventing rotation of wheel 30. This brake release is easily operated by the foot of the person using the stroller. The locking pressure is applied above lip 135, and the release pressure is applied at the upper end of the brake set and release 131.

Figure 14:
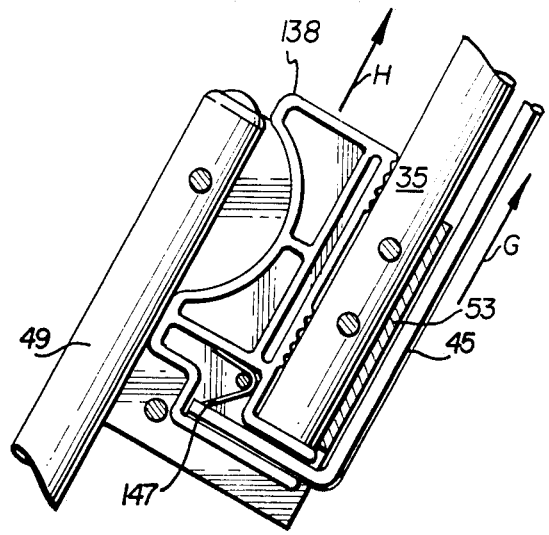
FIG. 14 is a partial sectional view indicating the movement of the unlocking rod so as to change the position of the locking mechanism.
Figure 15:
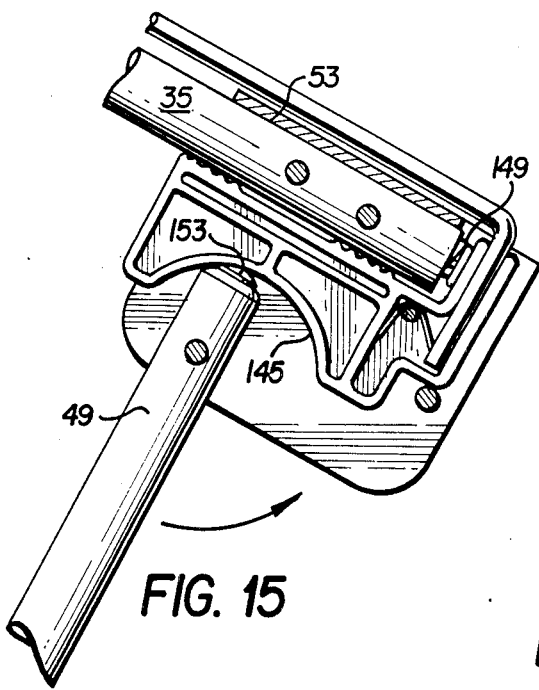
FIG. 15 is a partial sectional view showing the locking mechanism in a partially collapsed position.

Turning now to FIGS. 13 through 15, there is shown, in detail, operation of the releasable locking mechanism. Metal bracket 53 has a substantially straight wall on one side which abuts against the surface of leg 35. Leg 35 is secured to bracket 53 by means such as rivets 57 and 58 as shown in the partially broken away view of the leg in FIG. 13. A movable block 138 is maintained within strap 53. Block 138 includes a wall section 141 which abuts against and rides along leg 35 on one side and an arcuate surface 145 on the opposite side which is adjacent connecting rod 49. At the lower end of block 138, there is an extending flange 143 and an outer wall 145 between which finger 46 of release rod 45 extends. A leaf spring 147 is secured within the block and bears against one of the inner walls of the block as well as against finger 46 so as to stabilize the release rod. Coil spring 149 is maintained under compression and abuts at one end against rivet 58 and at the other end against flange 143.

Connecting rod 49 is rounded at the end and, preferably, contains a plastic button 153 to provide reduction of friction and wear. Further, connecting rod 49 is pivoted to strap 53 by means such as rivet 59.

Turning now to FIG. 14, there is shown the condition which exists when connecting rod 45 is moved in the direction of the arrow H by squeezing the bar grip as previously discussed. This action further compresses spring 145 149, FIG. 13, and moves block 138 in the direction as shown by the arrow. This allows rod 49 to pass into and along the arcuate section 145 when the handle is tilted forward. The action is shown partially completed in FIG. 15. It will be obvious that upon return of the handle to the upright position, rod 49 will pass beyond arcuate face 145 and spring 149 will cause block 138 to return to position as shown in FIG. 13, thus locking the stroller mechanism in place.

Figure 16:
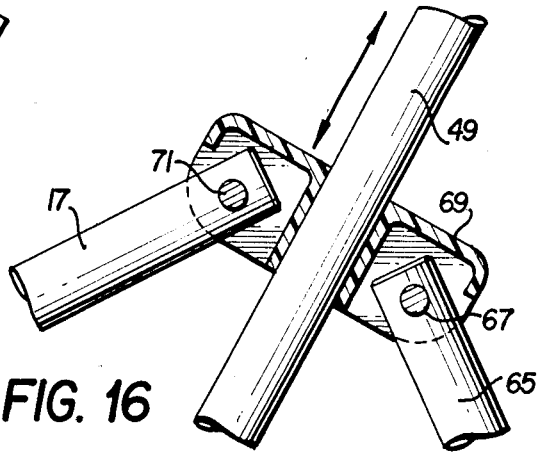
FIG. 16 is a partial sectional view showing the relationship between the connecting rod and the adjacent front and rear frames.

FIG. 16 is a partial sectional view taken through hollow block 69 to illustrate the movement of connecting rod 49 in either direction and the pivoting of leg 17 and leg 65 within the block on respective pivot pins 71 and 67.

Figure 17:
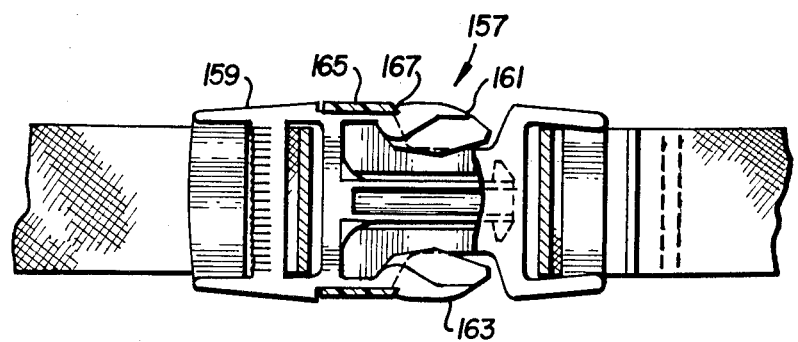
FIG. 17 is a partial sectional plan view of the buckle used with the safety harness shown in FIG. 1.

Although a number of latching mechanisms can be used with the safety harness, FIG. 17 shows a simplified type of latching mechanism which is preferably constructed of a plastic material. A male section 159 includes two fingers 161 and 163 which are cammed at their forward edges. When the male section is inserted into female section 145, the fingers are compressed and passed forward until the shoulders 167 pass the female section and are locked into place. The male section may be released by simply pressing the two fingers 161 and 163 towards each other.

As will now be apparent from the above description and drawings, the present invention provides a collapsible baby stroller which is easily collapsed using only one hand and which may be also returned to the upright position using only one hand. Further, when the stroller is in its completely collapsed position, it is extremely flat and easily carried or stored.

It is to be understood that the above description and drawings are illustrative only since components could vary in configuration and still remain within the scope of the present invention which is to be limited only by the following claims.

I claim:

1. A collapsible stroller comprising
a first U-shaped rod member;
a wheel mounted adjacent each of the outer ends of the bight of said first U-shaped member;
first and second rear leg members;
a wheel mounted at one end of each of said rear frame members;
first and second rigid members;
means for pivotally connecting the open ends of said first U-shaped member to said first and second rigid members respectively;
means for pivotally connecting the other ends of said rear frame members to said first and second rigid members respectively;
a seat support frame;
a molded seat and back secured on said seat frame;
means for pivotally mounting said seat support frame between said first and second rear leg members;
first and second connecting rods slidably passing through said first and second rigid members respectively;
means for pivotally connecting one end of said first and second connecting rods to said seat support frame between the legs of said first U-shaped and said first and second rear leg members;
first and second releasable locking means;
means for pivotally connecting said first and second releasable locking means to the other ends of said first and second connecting rods respectively;
a U-shaped handle;
means for securing the open ends of said U-shaped handle to said first and second locking means respectively;
a release bar slidably mounted to the legs of said second U-shaped handle adjacent the bight of said handle;
first and second release rods connected at one end to said release bar and connected at the other end of said first and second releasable locking means respectively whereby movement of said release bar toward the bight of said second U-shaped member releases said locking means and permits said stroller to be collapsed.

2. The stroller of claim 1 wherein each of said first and second releasable locking means comprises
a metal bracket hingedly interconnecting said open ends of said handle to said connecting rod;

a block within said bracket having a wall section which slidably abuts against the open end of said handle;

an arcuate surface on the said block opposite said wall section and adjacent said connecting rod, the end of said connecting rod extending beyond said arcuate surface when said stroller is in its upright position;

a spring for biasing said block in a direction so as to maintain said arcuate surface in non alignment with said end of said connecting rod; and a finger at the end of said release rod bearing against said block below said spring whereby said movement of said release bar slides said block against the bias of said spring and moves said arcuate surface adjacent said end of said connecting rod so as to permit rotation of said block about said end of said connecting rod.

3. A collapsible stroller comprising a seat support frame;

a U-shaped front frame having two wheels mounted thereon;

a rear frame having two further wheels mounted thereon;

a U-shaped handle;

at least one releasable locking means mounted on said handle interconnecting said seat support frame, said front frame, said rear frame and said handle, said locking means biased in a direction so as to lock said frames in an upright position;

means for pivotally interconnecting said seat support frame, said U-shaped front frame, said rear frame and said releasable locking means, whereby said frames and handle may be relatively moved from an upright operable position to a substantially horizontally collapsed position with the bight of said U-shaped handle being adjacent the bight of said U-shaped front frame so as to provide a means for carrying said stroller in said collapsed position when grasped by a human hand;

said means for pivotally interconnecting said frame parts and said handle including a pivotal connection for pivotally connecting the top of said front frame to the top of said rear frame and a connecting rod pivotally connected to said locking means, said connecting rod passing through said pivotal interconnection and slidable therein as said stroller is collapsed;

a release bar slidably mounted on the legs of said U-shaped handle adjacent the bight of said handle; and a release rod secured between said release bar and said releasable locking means whereby said bight of said handle and said release bar can be grasped by a single human hand so as to provide movement of said release bar towards the bight of said handle so as to overcome said bias and release said locking means and allow said U-shaped handle to be forwardly rotated so as to fold said seat support, front frame, rear frame and handle into said horizontally collapsed position.

4. The stroller of claim 3 further comprising a foot rest mounted on said front frame; and an aperture in a foot rest for exposing said portion of said front frame.

5. The stroller of claim 3 wherein said seat support frame comprises a rigid two-piece hinged seat pivotally mounted to said frame.

6. The stroller of claim 3 wherein said release bar comprises first and second sections slideably mounted on the adjacent legs; and a central section integral with said first and second sections and offset therefrom toward the bight of said U-shaped handle.

* * * * *